(12) United States Patent
Massarotti et al.

(10) Patent No.: US 8,737,014 B2
(45) Date of Patent: May 27, 2014

(54) ROTATIONAL AND LINEAR VIBRATION SENSING

(71) Applicant: Seagate Technology LLC, Cupertino, CA (US)

(72) Inventors: Christopher Anthony Massarotti, Berthod, CO (US); Frank William Bernett, Niwot, CO (US); Lou Supino, Niwot, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/755,715

(22) Filed: Jan. 31, 2013

(65) Prior Publication Data

US 2014/0104725 A1 Apr. 17, 2014

Related U.S. Application Data (60) Provisional application No. 61/712,651, filed on Oct. 11, 2012.

(51) Int. Cl.
*G11B 5/02* (2006.01)

(52) U.S. Cl.
USPC ........................................ 360/97.19

(58) Field of Classification Search
USPC ...................................... 360/97.19
See application file for complete search history.

(56) References Cited

U.S. PATENT DOCUMENTS

| 6,185,467 | B1 | 2/2001 | Romano et al. |
| 6,930,853 | B2 | 8/2005 | Settje et al. |
| 7,515,373 | B1 | 4/2009 | Supino |
| 7,633,704 | B2 | 12/2009 | Supino et al. |
| 7,852,723 | B2 * | 12/2010 | Onagi et al. ............... 369/53.18 |
| 8,077,420 | B2 * | 12/2011 | Tanner .......................... 360/71 |
| 8,379,342 | B2 * | 2/2013 | Huang et al. ................. 360/75 |
| 8,537,485 | B2 * | 9/2013 | DeRosa et al. ............... 360/55 |
| 2003/0231423 | A1 * | 12/2003 | Semba et al. ............. 360/77.02 |
| 2010/0067357 | A1 | 3/2010 | Huang et al. |
| 2013/0003219 | A1 | 1/2013 | DeRosa et al. |
| 2013/0114162 | A1 * | 5/2013 | Zhang et al. ............. 360/97.19 |
| 2013/0141811 | A1 * | 6/2013 | Hirano et al. ................ 360/51 |

* cited by examiner

*Primary Examiner* — Mark Blouin (57) ABSTRACT

In accordance with certain embodiments, a method is provided for sensing linear vibration and rotational vibration. The method includes generating a combined linear vibration and rotational vibration signal. The combined linear vibration and rotational vibration signal may then be processed with an adaptive filter.

17 Claims, 9 Drawing Sheets

ROTATIONAL AND LINEAR VIBRATION SENSING

PRIORITY CLAIM

This application claims the benefit under 35 U.S.C. section 119 of U.S. provisional patent application Ser. No. 61/712,651 filed on Oct. 11, 2012 and entitled "Rotational and Linear Vibration Sensing" which is hereby incorporated by reference in its entirety for all purposes.

BACKGROUND

Vibrational forces can lead to problems in the operation of electronic devices. For example, disk drives can encounter vibration during use that can impact the performance of the drive. The vibration is often referred to as having a linear vibration component and rotational vibration component. As technology has advanced, both linear vibration and rotational vibration have become of greater interest to counteract.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In accordance with certain embodiments, a method is provided for sensing linear vibration and rotational vibration. The method includes generating a combined linear vibration and rotational vibration signal. The combined linear vibration and rotational vibration signal may then be processed with an adaptive filter.

These and various other features and advantages will be apparent from the following detailed description.

DETAILED DESCRIPTION

Figure 1:
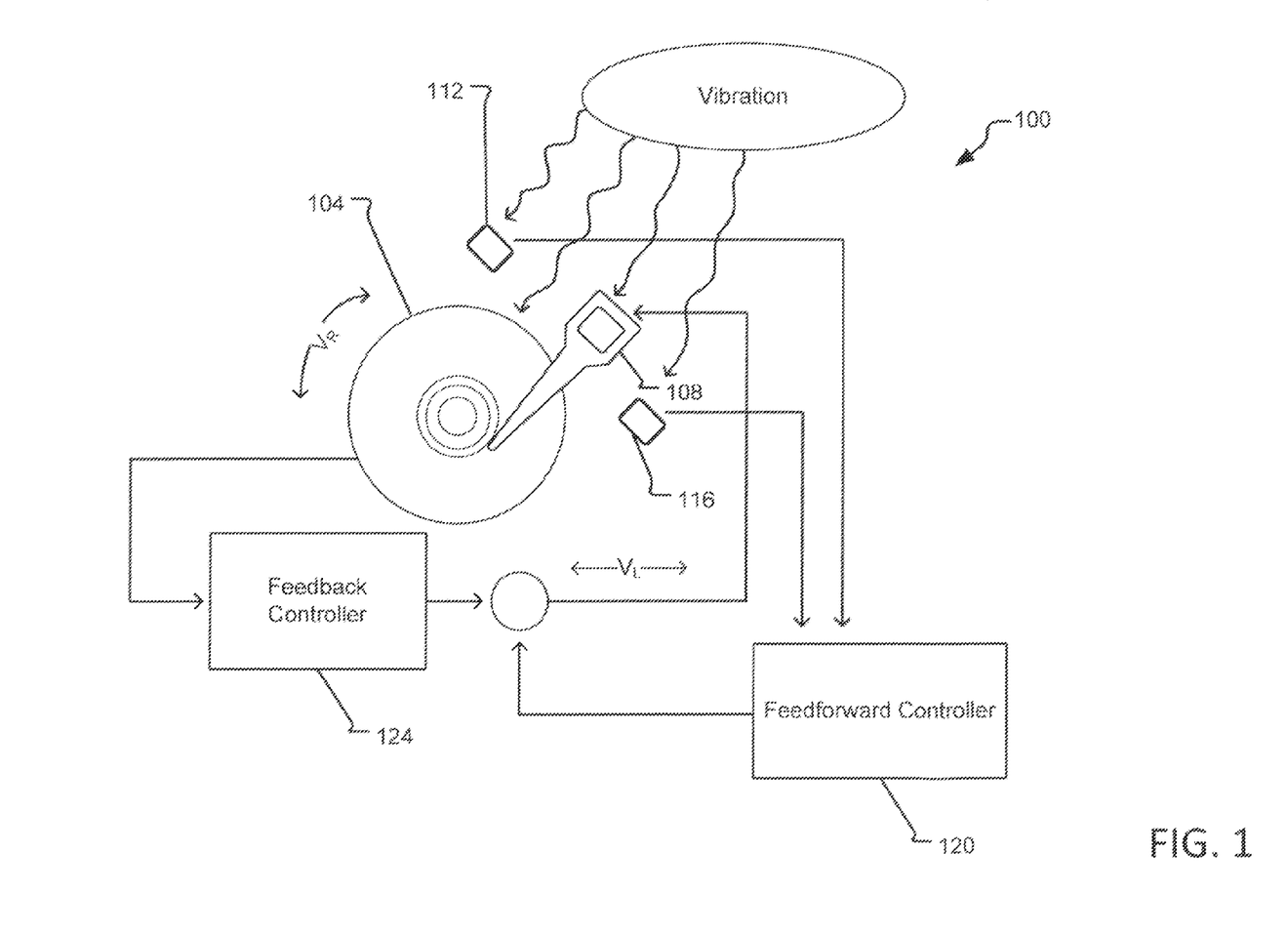
FIG. 1 illustrates an example of an electronic device experiencing vibrational forces and a system for providing feedback, in accordance with certain embodiments of the present disclosure.

Electronic devices can experience vibrational forces from external and internal sources. The vibration is often referred to as linear vibration and rotational vibration. FIG. 1 illustrates an example of vibrational forces being exerted on a device. In the illustration of FIG. 1, a disc drive is used as the example device.

In FIG. 1, system 100 is shown as responding to vibrational forces. A disc drive platter 104 and actuator 108 are shown. These components experience both rotational vibration $V_r$ and linear vibration $V_L$. Sensors 112 and 116 are shown positioned on different ends of the device. The sensors 112 and 116 can sense the vibrational forces and be used by a feed forward controller 120 to adjust the positioning of the actuator 108. A feedback controller 124 can also be used to position the actuator 108.

Rotational vibration, $V_r$, has typically been the greater concern with devices like disc drives because platters are rotated away from the position of heads of the actuator. In contrast, linear vibration, $V_L$, tends to move platters and heads of the actuator together in the same direction such that there is less of a concern about error. However, as the frequency range of disc drive technology has increased, linear vibration has become more of an issue.

Figure 2:
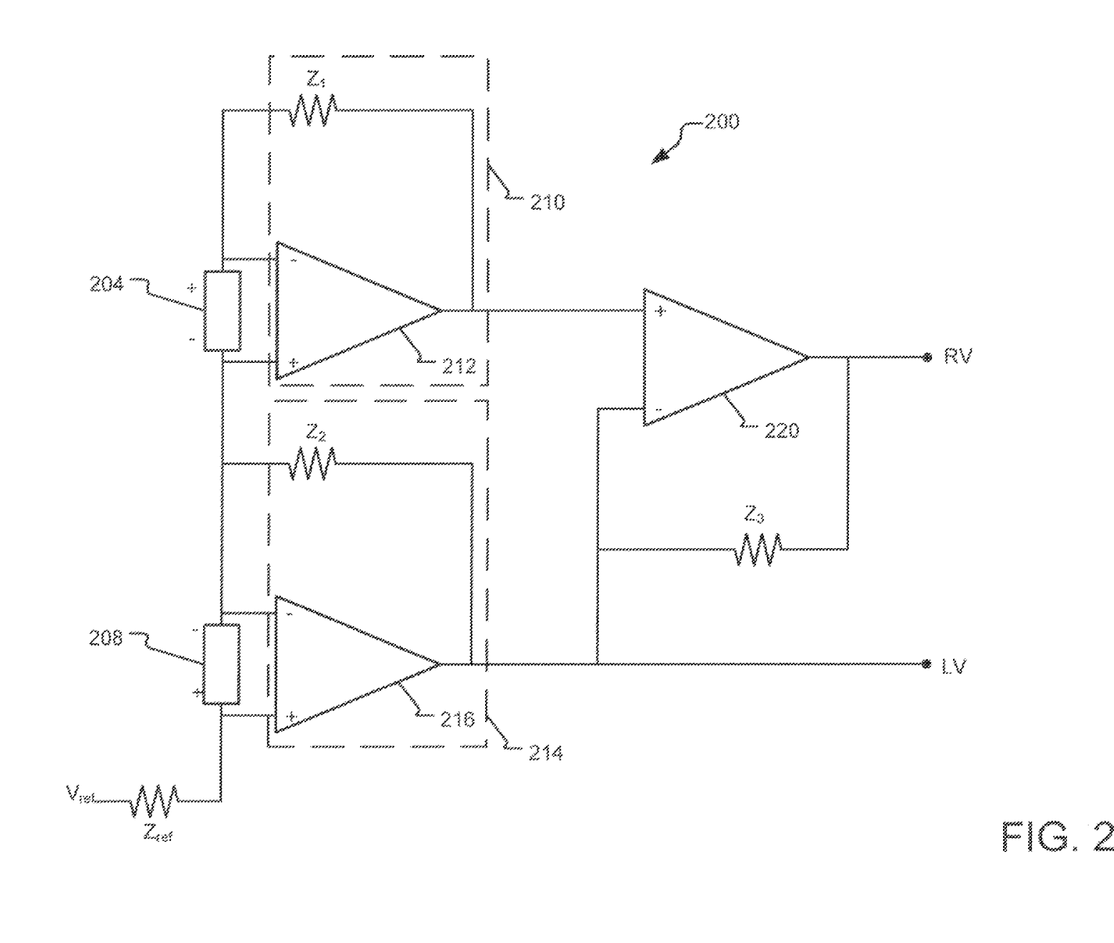
FIG. 2 illustrates an example of a system for sensing rotational and linear vibration.

FIG. 2 illustrates an example of a system 200 that can be used to measure rotational vibration and linear vibration. The system of FIG. 2 shows vibration sensors 204 and 208. These sensors can be positioned, for example, as they are shown in FIG. 1 at the opposite ends of a device. Each sensor includes a sensor element that responds to vibrational forces. One example of a sensor element used by the sensors is a piezoelectric sensor element.

FIG. 2 shows that a linear vibration signal, LV, can be generated from a single sensor serving as an input to a charge amplifier circuit 214. The charge amplifier circuit 214 is shown comprised of operational amplifier 216 and impedance $Z_2$. An input, $V_{ref}$, can be used as a voltage supply for the sensors in the circuit 214 and impedance $Z_{ref}$ can be used to limit the current.

FIG. 2 also shows that a rotational vibration signal, RV, can be generated from multiple sensors. In FIG. 2, sensor 204 serves as an input to a charge amplifier circuit comprised of operational amplifier 212 and impedance $Z_1$. The sensor 204 is oriented so that it has the opposite polarity of sensor 208. Because of the reversal of the polarity, when an output of the first charge amplifier circuit 210 and an output of the second charge amplifier circuit 214 are input into a differential amplifier 220 (with feedback impedance $Z_3$), the sum rather than the difference of the sensor outputs can be generated. This sum can be used as the rotational vibration signal. Thus, the system shown in FIG. 2 shows how separate signals indicative of rotational vibration and linear vibration can be generated using at least two charge amplifier circuits 210 and 214.

Figure 3:
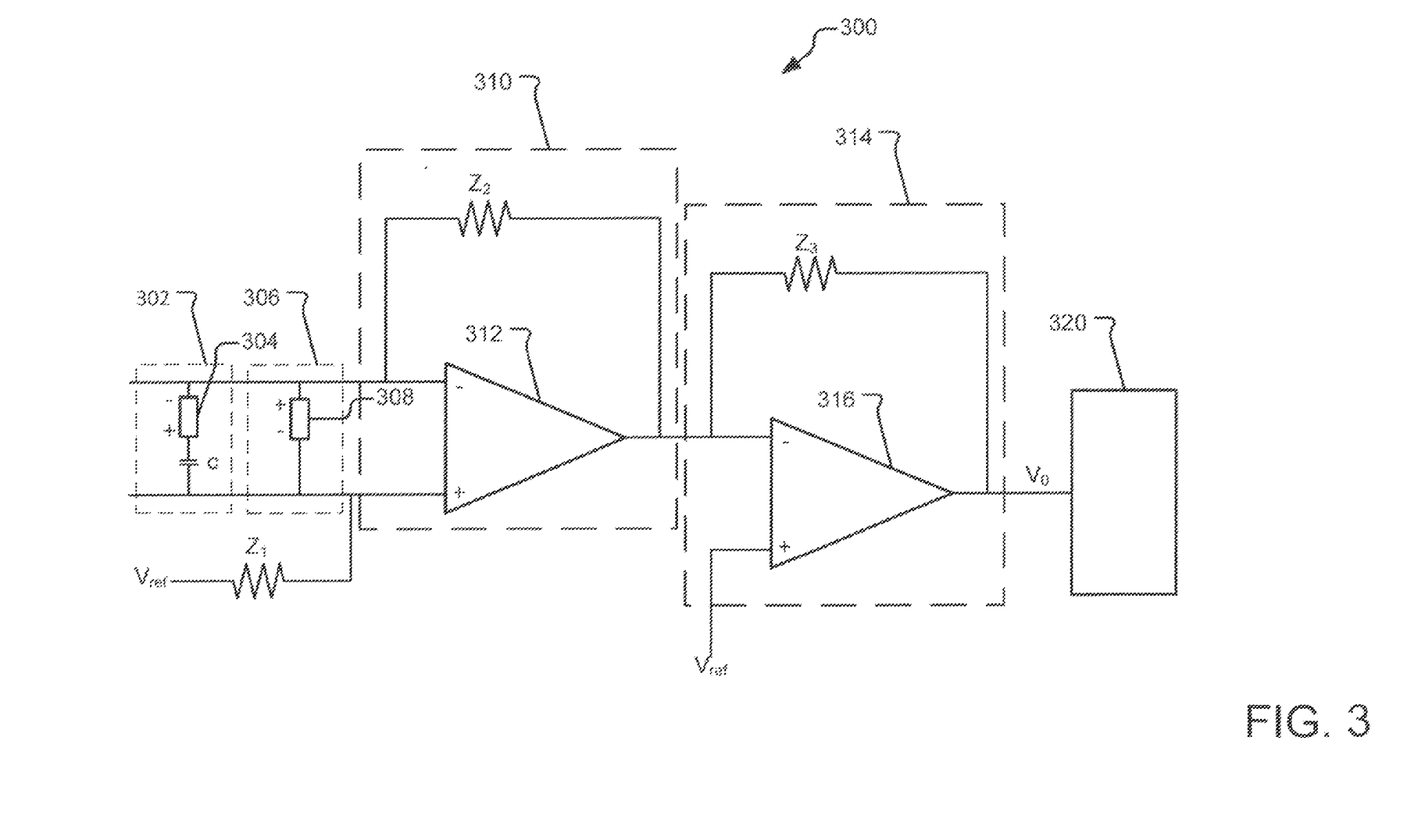
FIG. 3 illustrates an example of a system for generating a combined rotational and linear vibration signal, in accordance with certain embodiments of the present disclosure.

Referring now to FIG. 3, a system 300 is shown in accordance with certain embodiments of the present disclosure. A first vibration sensor circuit 302 is shown comprised of a sensor 304 and a capacitor C coupled in series. A second sensor circuit 306 is shown comprised of sensor 308 by itself. Outputs of these sensor circuits 302 and 306 are shown coupled together. Orientation of the polarity of the sensor circuits is reversed relative to one another. As a result, the magnitude of one of the sensor circuit's outputs is effectively subtracted from the other. FIG. 3 also shows a reference voltage Vref and impedance $Z_1$.

As a result of this configuration in FIG. 3, when linear vibration is encountered sensors of equal sensitivity, positioned as shown for example in FIG. 1, would experience the same output. If the gain of sensor circuits 302 and 306 were not adjusted, for example by capacitor C in FIG. 3, the coupling of the outputs of sensor circuits 302 and 306 together would cause the signals from the two sensors to cancel one another. By adjusting the gains of the two sensor circuits 302 and 306 to be different from one another, no complete cancellation takes place—so a combined signal remains to indicate linear vibration.

When rotational vibration is encountered and the sensors 304 and 308 are located on opposite sides of the axis of rotation of the rotational vibration, the output signals from the sensors 304 and 308 will be out of phase. Thus, the configuration shown in FIG. 3 will create a superposition that is effectively an addition of the magnitudes of the signals produced by the two sensor circuits 302 and 306, if the sensors are located on opposite sides of the center of rotation.

The outputs of the two sensor circuits in system 300 are shown coupled to a charge amplifier circuit 310 comprised of operational amplifier 312 and impedance $Z_2$. The output from the charge amplifier circuit 310 can be input to a bandpass filter circuit 314 shown comprised of operational amplifier 316 and impedance $Z_3$ and reference voltage $V_{ref}$. The resulting output from the bandpass filter circuit, $V_o$, is a signal that represents both linear vibration and rotational vibration.

The use of the capacitor, C, in combination with sensor element 304 allows the gain of the sensor circuit 302 comprised of sensor element 304 and capacitor, C, to be adjusted, relative to the gain of the sensor circuit 306 that is comprised of sensor 308 by itself. This is but one way in which the gains of the sensor circuits 302 and 306 may be adjusted relative to one another. By adjusting the gain of the sensor circuits 302 and 306 to be different from one another, one is able to ensure that the output signal, $V_o$, contains a component indicative of linear rotation. If two sensor circuits were used, where each had the same gain, the output of the sensors in FIG. 3 would cancel one another out for purposes of linear rotation.

As can be seen by comparing the systems of FIG. 3 and FIG. 2, the embodiment shown in FIG. 3 saves space and reduces the number of components. The system shown in FIG. 2 requires a second charge amplifier as well as supporting components. But a second charge amplifier is not required for the system shown in FIG. 3. Thus, the embodiment of FIG. 3 saves on components, space on a circuit board, and cost in manufacturing. The embodiment in FIG. 3 saves the cost of the additional operational amplifier that would be required and also the cost of supporting components that would be required.

FIG. 3 also shows that the output signal, $V_o$, can be processed by an adaptive filter 320. An adaptive filter is a filter that self-adjusts its transfer function according to an optimization algorithm driven by an error signal. The implementation of the adaptive filter 320 can vary in accordance with the desired adjustments for a particular signal. The input signal to the adaptive filter has a signal that includes both a component indicative of rotational vibration and a component indicative of linear vibration.

Figure 4:
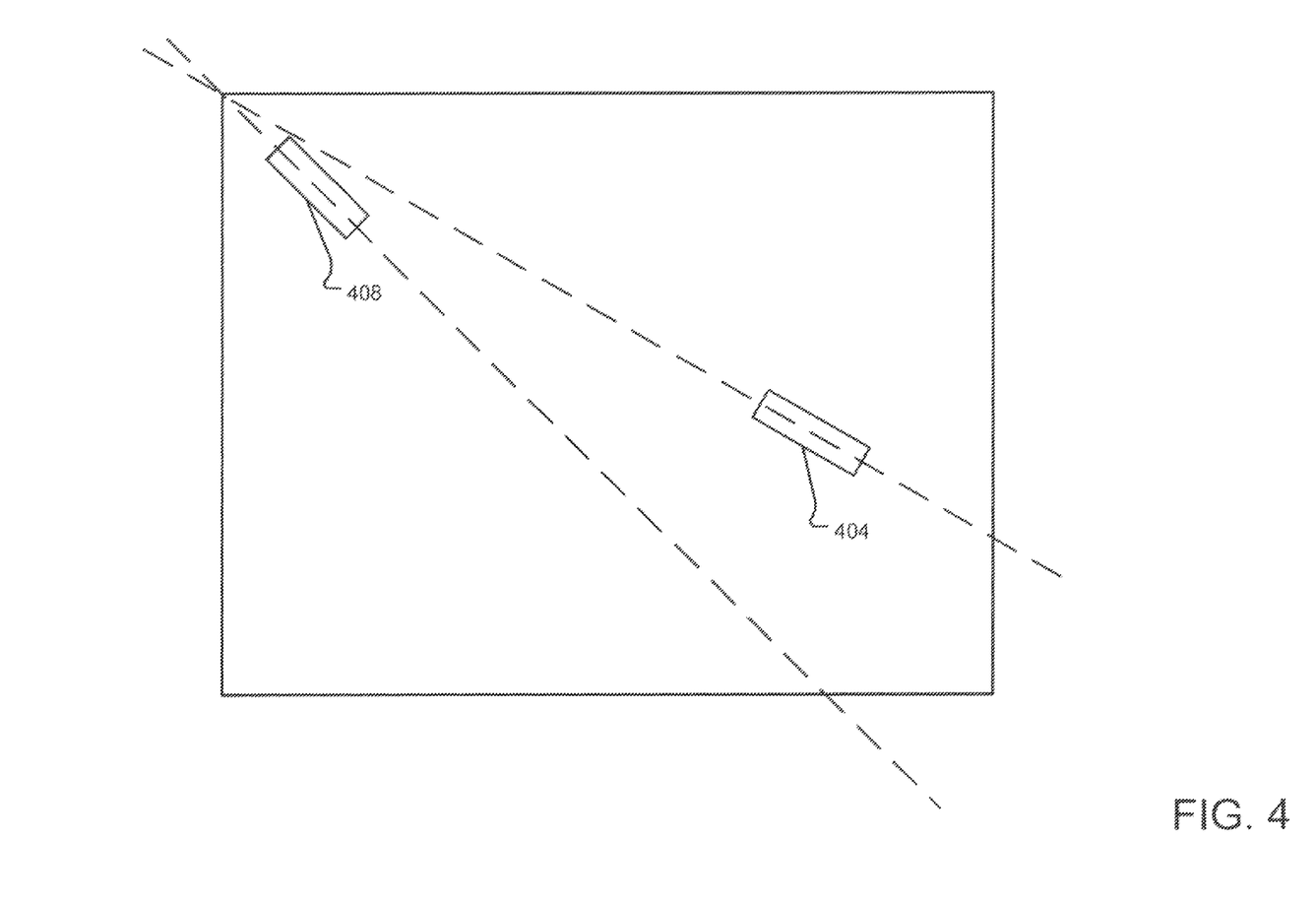
FIG. 4 illustrates and example of two vibration sensor elements oriented on a device so that the axes of the sensing elements are not parallel, in accordance with certain embodiments of the present disclosure.
Figure 5:
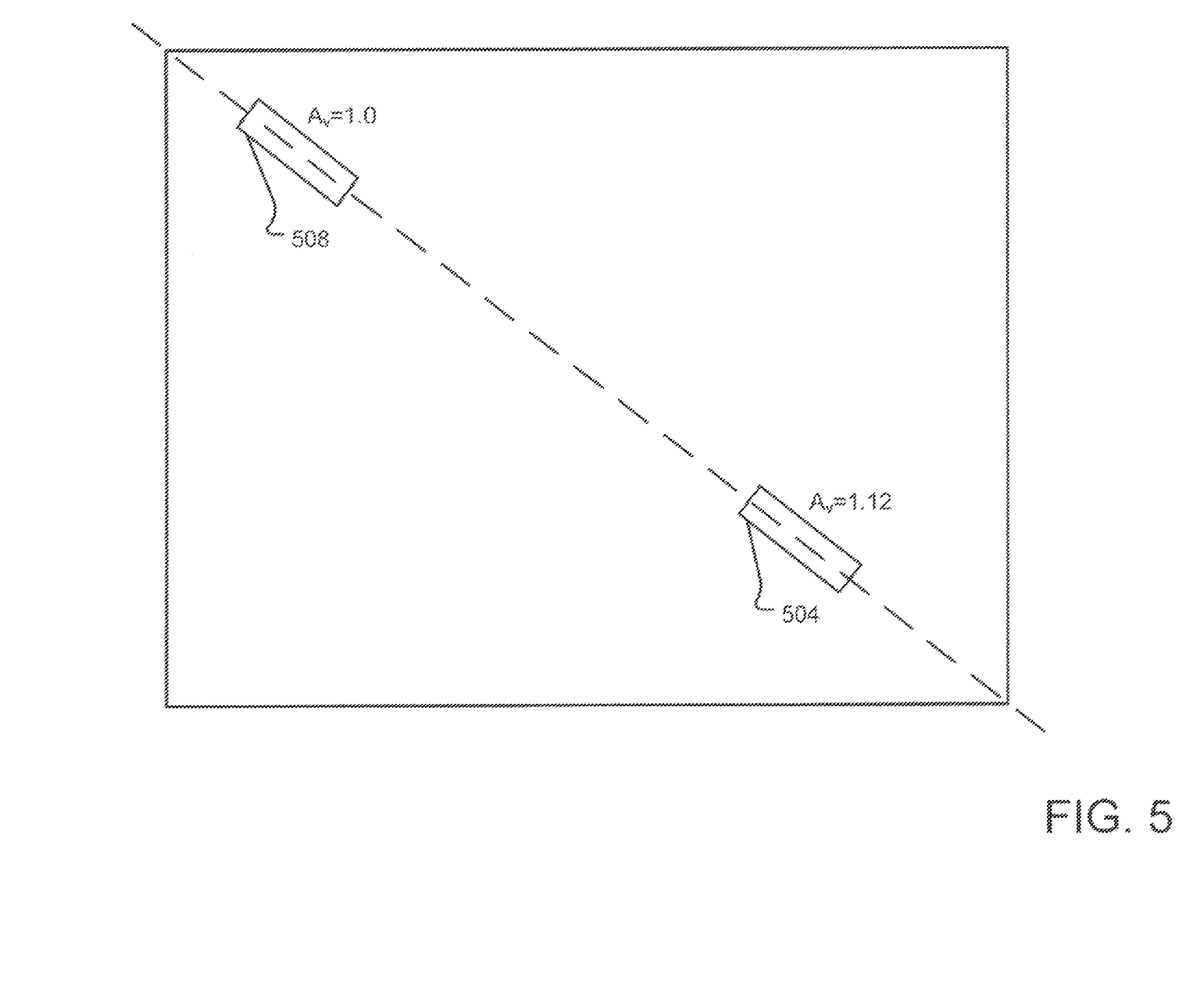
FIG. 5 illustrates an example of two vibration sensor elements on a device that have different gains, in accordance with certain embodiments of the present disclosure.

FIGS. 4 and 5 illustrate examples of how the gain of the two vibration sensor circuits can be adjusted. In FIG. 4, two sensors, 404 and 408, are positioned for use at opposite ends of a device in order to detect vibration. The sensors 404 and 408 are shown oriented such that they are not in parallel alignment. Parallel alignment should be understood to include co-linear alignment. As a result, respective sensor elements in sensors 404 and 408 are also not in parallel alignment. Thus, when the sensors 404 and 408 experience linear vibration, outputs from each sensor 404 and 408 will be different from the other (assuming the sensors 404 and 408 have the same sensitivity to begin with). One example of a sensor element used by the sensors 404 and 408 is a piezoelectric sensor element.

FIG. 5 shows a different arrangement of sensors. In FIG. 5, sensors 504 and 508 are shown. The sensors 504 and 508 are shown positioned for use at opposite ends of a device. Each sensor has been selected, however, to have a predetermined gain that is different relative to the other sensor. Thus, sensor 508 is shown with a gain $A_v=1.0$ and sensor 504 is shown with a gain $A_v=1.12$. When referring specifically to a sensor device, the gain of the sensor device is sometimes referred to as the "sensitivity" of the sensor device. However, since the sensor device can be combined with other components, the gain of the "sensor circuit" is typically used herein. When the sensors are aligned along the same axis, as shown in FIG. 5, making sure that the sensors do not have the same gain ensures that the linear vibration value, LV, such as that computed in FIG. 2, does not equal zero.

Figure 6:
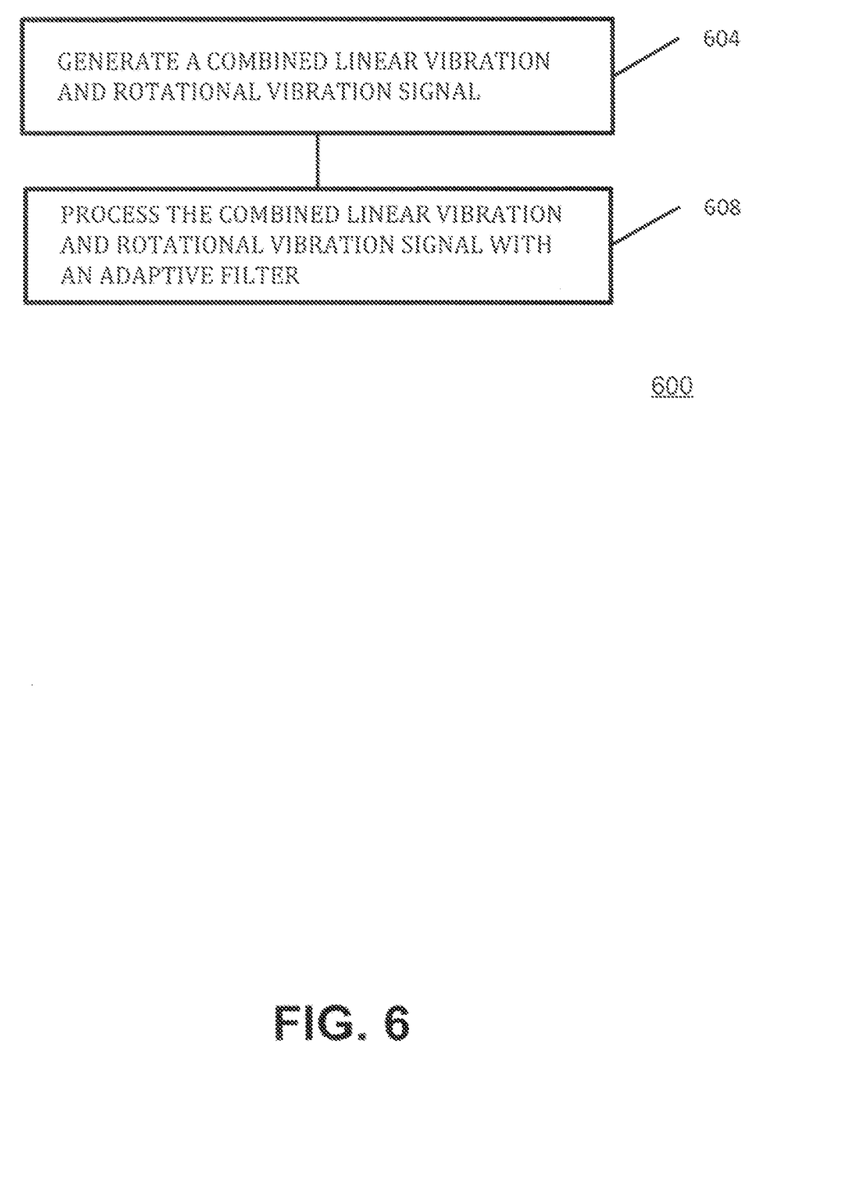
FIG. 6 illustrates an example of a flow chart demonstrating a method of responding to vibrational forces, in accordance with certain embodiments of the present disclosure.

Referring now to FIG. 6, a flow chart 600 illustrating a method of detecting vibration can be seen. In block 604 of flow chart 600, a combined linear vibration and rotational vibration signal is generated. In block, 608, the combined linear vibration and rotational vibration signal is processed with an adaptive filter.

Figure 7A:
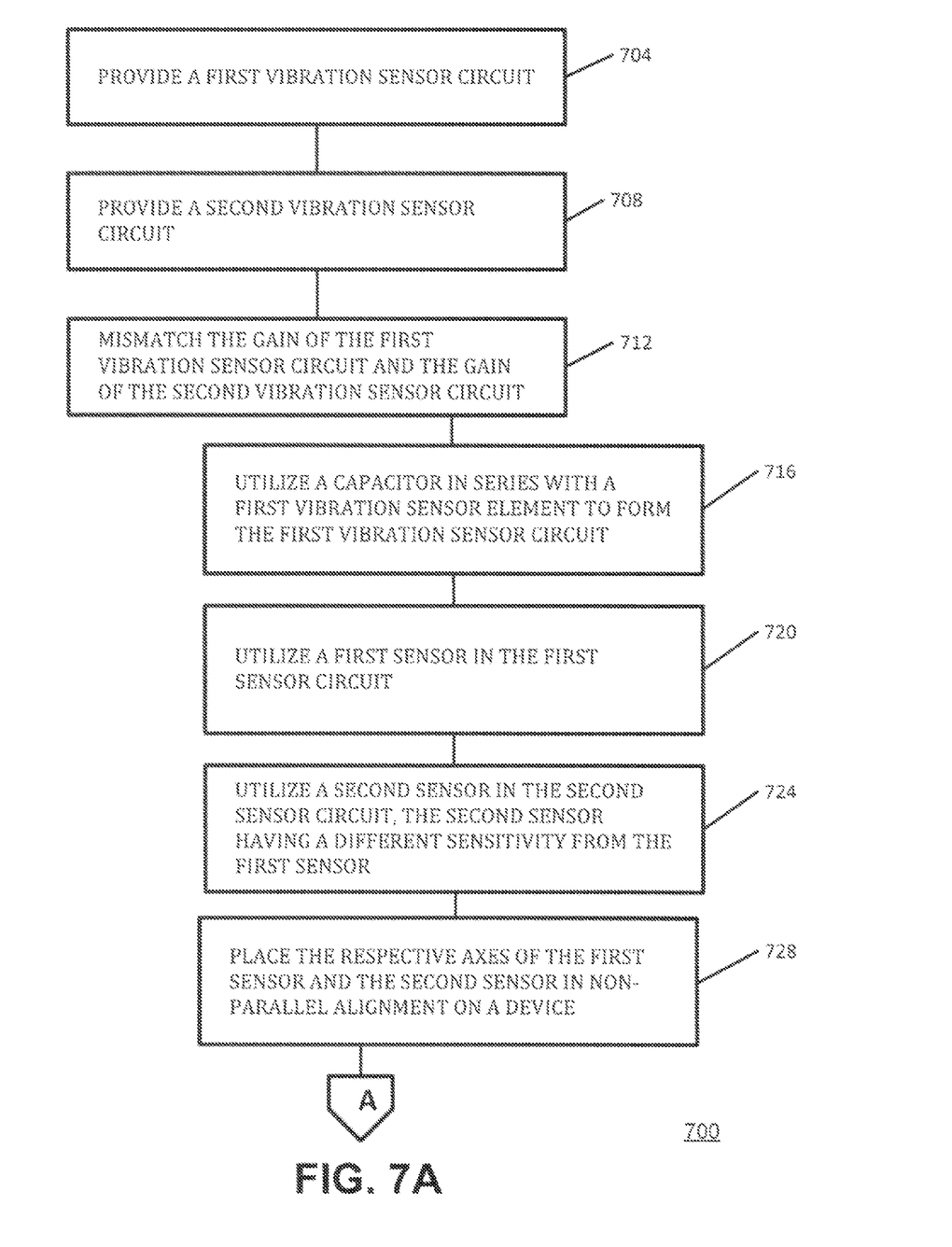
FIGS. 7A and 7B illustrate a flow chart demonstrating an example of a method of responding to vibrational forces, in accordance with certain embodiments of the present disclosure.
Figure 7B:
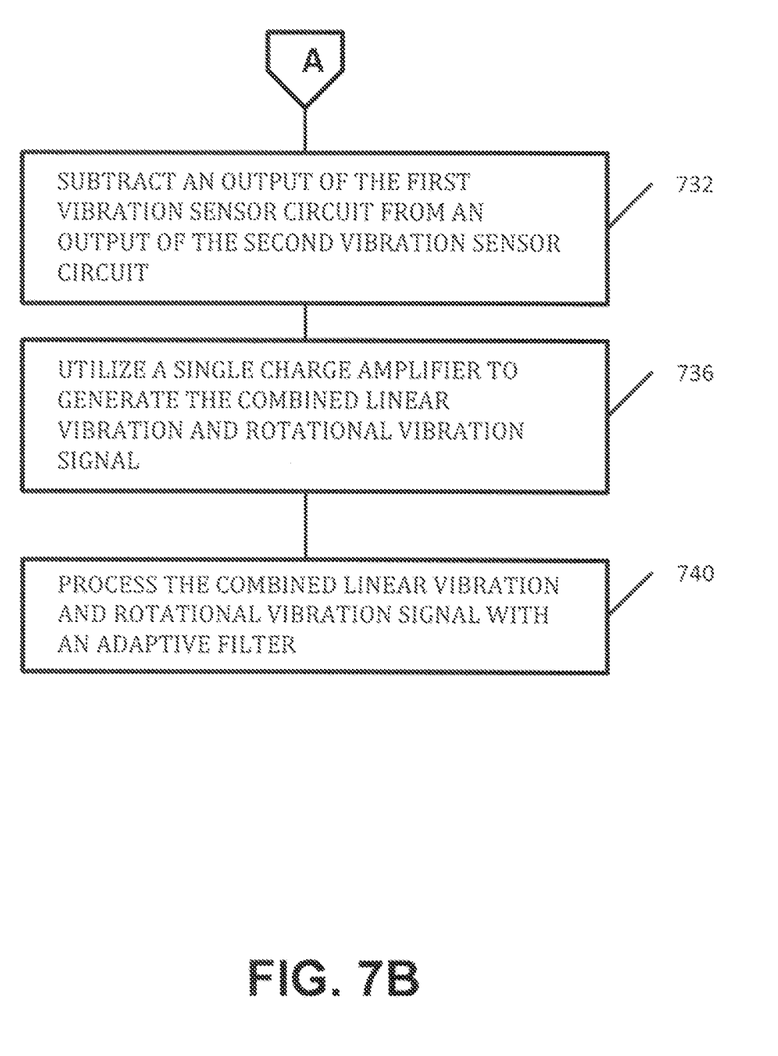

FIGS. 7A and 7B illustrate another embodiment. In flow chart 700 of FIGS. 7A and 7B, block 704 shows that a first vibration sensor circuit may be provided. Similarly, block 708 shows that a second vibration sensor circuit may be provided. The gain of the first vibration sensor circuit and the gain of the second vibration sensor circuit may be intentionally mismatched, as shown by block 712. Thus, the two circuits have predetermined mismatched gains.

Various manners of mismatching the gains of the sensor circuits in response to the same vibrational force may be utilized. For example, block 716 shows that a capacitor in series with a first vibration sensor element may be utilized as the first vibration sensor circuit. Blocks 720 and 724 illustrate that the sensitivity of the two sensors used in the sensor circuits be selected to be different so that the gain of the two sensor circuits is different. And, block 728 illustrates that the axes of the two sensors could be placed in non-parallel alignment on a device. The non-parallel alignment would cause sensors of the same sensitivity to respond differently to the same vibrational force with respect to their respective outputs.

In block 732, the output of the first vibration sensor circuit may be subtracted from the output of the second vibration sensor circuit. This could effectively be accomplished, for example, by wiring the sensor circuits together in parallel but with reversed polarity.

In block 736, a single charge amplifier may be used to generate the combined linear vibration and rotational vibration signal. And, in block 740, the combined linear vibration and rotational vibration signal may be processed with an adaptive filter. The adaptive filter may then be used as desired to provide feed forward correction to the positioning of an actuator, for example.

Thus, this system may be utilized to provide feed forward correction in response to both linear and rotational vibration forces.

Figure 8:
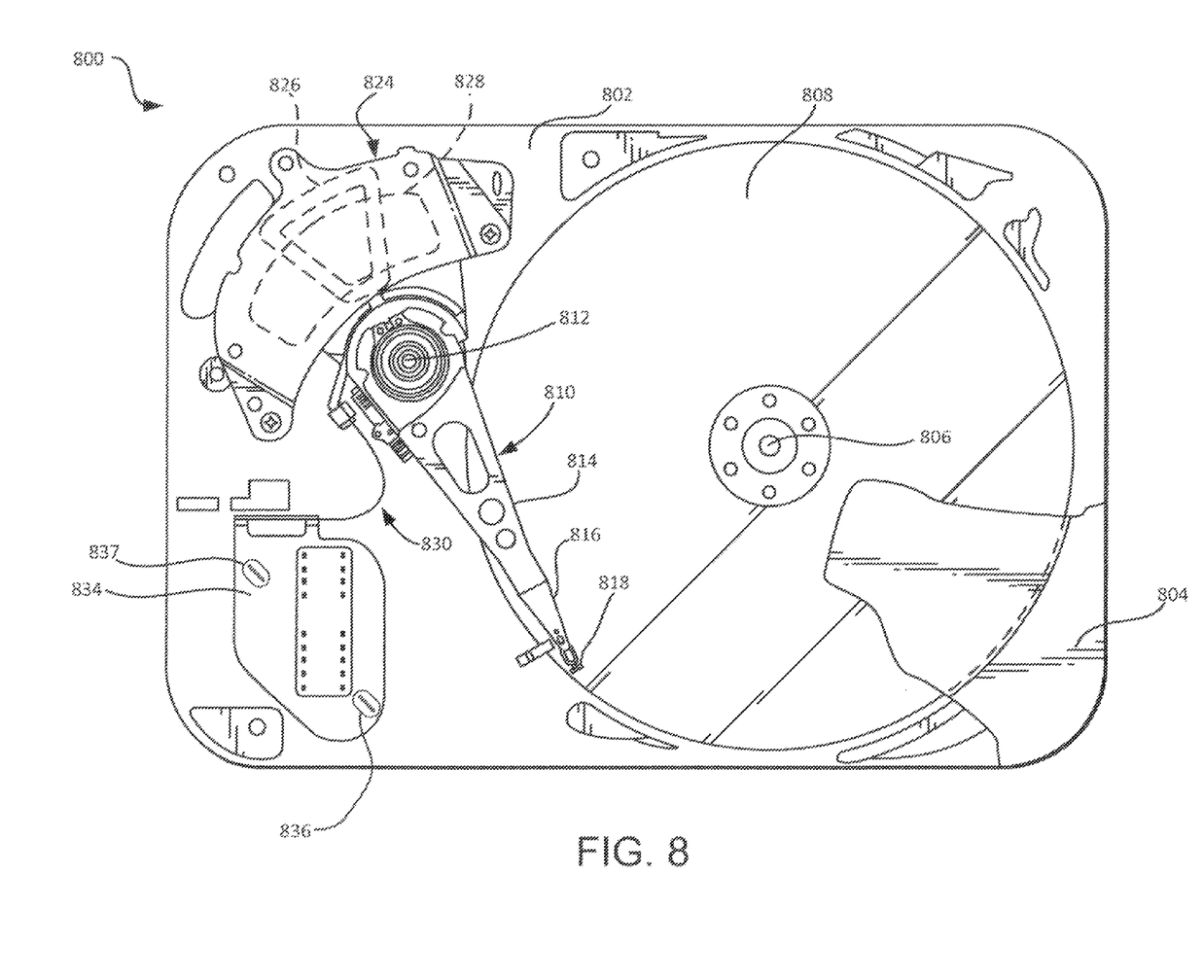
FIG. 8 illustrates a plan view of an example disc drive using vibration sensing, in accordance with certain embodiments of the present disclosure.

FIG. 8 illustrates a plan view of an example disc drive 800. The disc drive 800 includes a base 802 to which various components of the disc drive 800 are mounted. A top cover 804, shown partially cut away, cooperates with the base 802 to form an internal, sealed environment for the disc drive in a conventional manner. The components include a spindle motor 806 that rotates one or more storage medium discs 808 at a constant high speed. Information is written to and read from tracks on the discs 808 through the use of an actuator assembly 810, which rotates during a seek operation about a bearing shaft assembly 812 positioned adjacent the discs 808. The actuator assembly 810 includes a plurality of actuator arms 814 that extend towards the discs 808, with one or more flexures 816 extending from each of the actuator arms 814. Mounted at the distal end of each of the flexures 816 is a head 818 that includes an air bearing slider enabling the head 818 to fly in close proximity above the corresponding surface of the associated disc 808. The distance between the head 818 and the storage media surface during flight is referred to as the fly height.

During a seek operation, the track position of the head 818 is controlled through the use of a voice coil motor (VCM) 824, which typically includes a coil 826 attached to the actuator assembly 810, as well as one or more permanent magnets 828 which establish a magnetic field in which the coil 826 is immersed. The controlled application of current to the coil 826 causes magnetic interaction between the permanent magnets 828 and the coil 826. As the coil 826 moves, the actuator assembly 810 pivots about the bearing shaft assembly 812, and the transducer heads 818 are caused to move across the surfaces of the discs 808.

The spindle motor 806 is typically de-energized when the disc drive 800 is not in use for extended periods of time. The transducer heads 818 are moved away from portions of the disk 808 containing data when the drive motor is de-energized. The transducer heads 818 are secured over portions of the disk not containing data through the use of an actuator latch arrangement and/or ramp assembly 844, which prevents inadvertent rotation of the actuator assembly 810 when the drive discs 808 are not spinning.

A flex assembly 830 provides the requisite electrical connection paths for the actuator assembly 810 while allowing pivotal movement of the actuator assembly 810 during operation. The flex assembly 830 includes a printed circuit board 834 to which a flex cable connected with the actuator assembly 810 and leading to the head 818 is connected. The flex cable may be routed along the actuator arms 814 and the flexures 816 to the transducer heads 818. The printed circuit board 834 typically includes circuitry for controlling the write currents applied to the transducer heads 818 during a write operation and a preamplifier for amplifying read signals generated by the transducer heads 818 during a read operation. The flex assembly 830 terminates at a flex bracket for communication through the base deck 802 to a disc drive printed circuit board (not shown) mounted to the bottom side of the disc drive 800.

The disc drive 800 also includes two vibration sensors 837 and 836 mounted on circuit board 834. The sensors 836 and 837 could be located at other positions on the device 800, as desired.

It is also noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

It will be understood that while embodiments have been described in conjunction with specific examples, the foregoing description and examples are intended to illustrate, but not limit the scope of the invention. Other aspects, advantages, and modifications will be apparent to those of ordinary skill in the art to which the claims pertain. The elements and use of the above-described embodiments can be rearranged and combined in manners other than specifically described above, with any and all permutations within the scope of the disclosure.

The implementations described above and other implementations are within the scope of the following claims.

What is claimed is:

1. A method comprising:
    mismatching gain of a first vibration sensor circuit and gain of a second vibration sensor circuit;
    generating a combined linear vibration and rotational vibration signal from the first vibration sensor circuit and the second vibration sensor circuit; and
    utilizing the combined linear vibration and rotational vibration signal as an input to an adaptive filter.

2. The method as claimed in claim 1 wherein generating a combined linear vibration and rotational vibration signal comprises:
    generating the combined linear vibration and rotational vibration signal by a single charge amplifier.

3. The method as claimed in claim 1 wherein generating the combined linear vibration and rotational vibration signal comprises:
    subtracting an output of the first vibration sensor circuit from an output of the second vibration sensor circuit.

4. The method as claimed in claim 1 wherein mismatching the gain of the first vibration sensor circuit and the gain of the second vibration sensor circuit comprises:
    utilizing a capacitor in series with a first vibration sensor element to form the first vibration sensor circuit.

5. The method as claimed in claim 1 wherein a first sensor in the first sensor circuit and a second sensor in the second sensor circuit have different sensitivities.

6. The method as claimed in claim 1 wherein mismatching the gain of the first vibration sensor circuit and the gain of the second vibration sensor circuit comprises:
    placing the respective axes of a first sensor in the first sensor circuit and a second sensor in the second sensor circuit in non-parallel alignment on a device.

7. The method as claimed in claim 1 wherein the generating the combined linear vibration and rotational vibration signal comprises utilizing a bandpass filter.

8. The method as claimed in claim 1 wherein the generating the combined linear vibration and rotational vibration signal comprises utilizing a bandpass filter.

9. A system comprising:
    a first vibration sensor circuit having a first gain;
    a second vibration sensor circuit having a second gain different from the first gain; and
    an adaptive filter to receive as an input the difference between an output of the first vibration sensor circuit and an output of the second vibration sensor circuit.

10. The system as claimed in claim 9 and further comprising:
    a single charge amplifier coupled with the output of the first vibration sensor circuit and coupled with the output of the second vibration sensor circuit.

11. The system as claimed in claim 9 wherein an output of the single charge amplifier is coupled with a bandpass filter.

12. The system as claimed in claim 9 wherein an output of the bandpass filter is coupled with an input of the adaptive filter.

13. The system as claimed in claim 9 wherein the second vibration sensor circuit comprises a capacitor in series with a sensor element so as to cause the second vibration sensor circuit to have a gain different from the first vibration sensor circuit.

14. The system as claimed in claim 9 wherein the first vibration sensor circuit comprises a first sensor element and wherein the second vibration sensor circuit comprises a second sensor element and wherein the first sensor element and the second sensor element have different sensitivities.

15. The system as claimed in claim 9 wherein the first sensor circuit comprises a first sensor element and wherein the second sensor circuit comprises a second sensor element and wherein the first sensor element and the second sensor element are positioned on a device so that their respective axes are not in parallel.

16. The system as claimed in claim 9, the system further comprising:

a bandpass filter coupled with the adaptive filter.

17. The system as claimed in claim 10 wherein polarity of an output of the first vibration sensor circuit and polarity of an output of the second vibration sensor circuit are reversed relative to one another.

\* \* \* \* \*